United States Patent Office 2,961,351
Patented Nov. 22, 1960

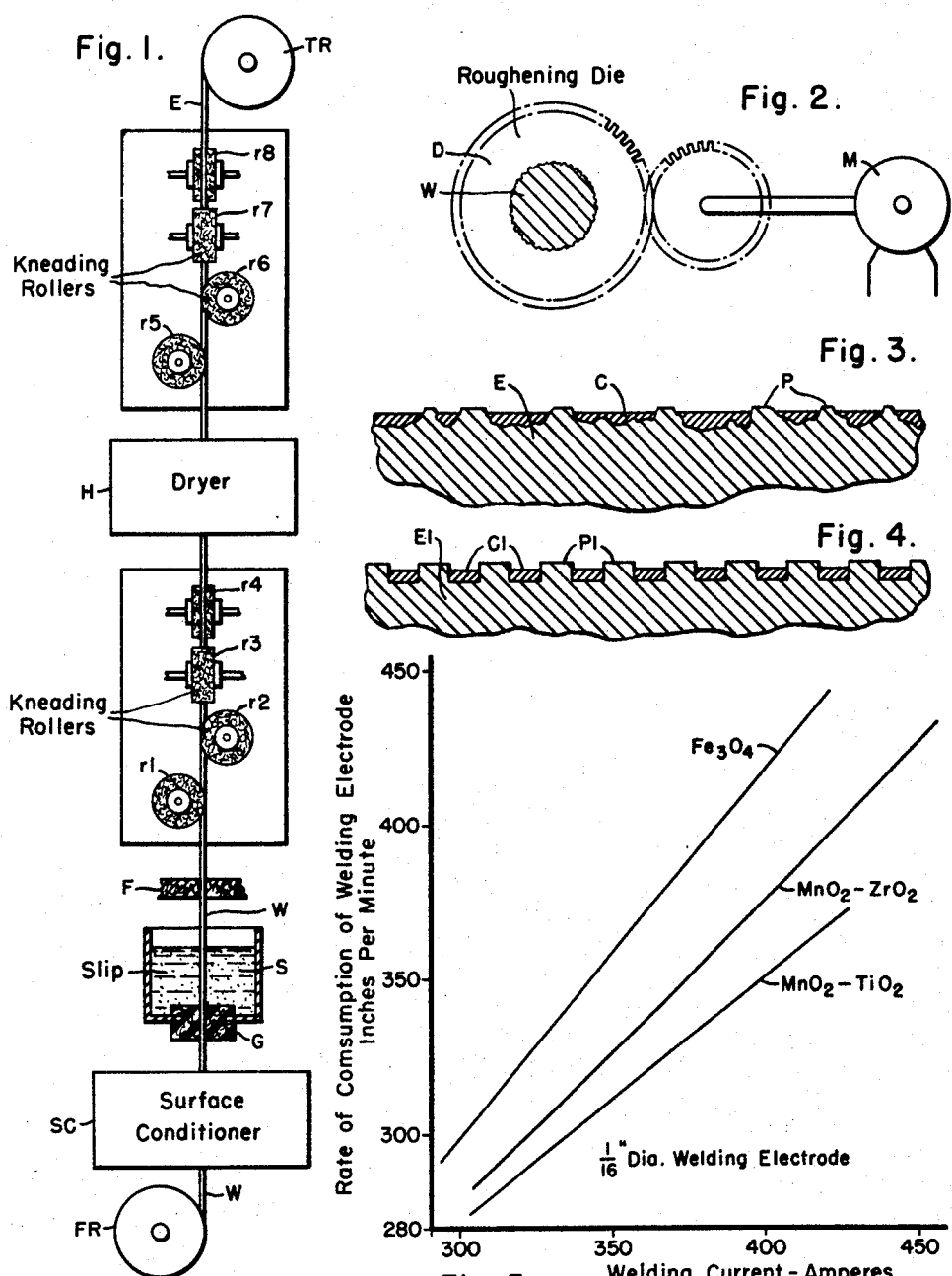

2,961,351
COATED ARC WELDING ELECTRODE WIRE

Howard C. Ludwig, Pittsburgh, Pa., assignor to Westinghouse Electric Corporation, East Pittsburgh, Pa., a corporation of Pennsylvania Original application Dec. 6, 1952, Ser. No. 324,473, now Patent No. 2,818,496, dated Dec. 31, 1957. Divided and this application Dec. 2, 1955, Ser. No. 550,517

11 Claims. (Cl. 117—203)

My invention relates to arc welding and has particular relation to welding electrodes. This application is a division of my Patent 2,818,496 granted December 31, 1957, and assigned to Westinghouse Electric Corporation.

In accordance with the specific aspects of my invention disclosed in the above-identified patent, I provide a welding electrode particularly suitable for welding in a gaseous shield; this electrode has a coating of an oxide or of other oxygen containing material which acts to stabilize the arc during welding. Since a welding electrode is flexed and bent while in use, the coating should be very thin, so that the bending of the electrode does not break the coating. A thin coating is also desirable to avoid any excess of oxygen from the oxide.

The oxide or the oxygen containing material may be applied chemically as by oxidation processes or by processes identified by the trade names Bonderizing, Parkerizing, Granodizing, Costellizing, or it may be applied mechanically. In either event the surface of the electrode is in accordance with my invention conditioned for the deposit by roughening. The roughening should be such as to produce fine irregularities distributed substantially uniformly over the surface. This conditioning of the surface of the wire has several advantages among which the most important are that the quantity of coating material which may be deposited is substantially increased so that adequate material for stabilizing is available in a relatively thin coating. The roughening also has the advantage that it provides projections between the coated regions through which electrical contact between the electrode and the welding power supply may be made.

The quantity of material deposited on the electrode depends on the diameter of the electrode and the rate at which the filler material from the electrode is to be deposited in use. The thickness of the layer of the coating should be just sufficient to produce arc stabilization with the electrode arc terminus remaining substantially fixed just at or very near the end of the electrode. I have found that this object may be accomplished for electrodes of a diameter commonly encountered in practice even when the metal from it is to be deposited at a very high rate with a very thin layer of the order of a few milligrams per foot of oxygen material on the electrode. I have further found that if the layer is so thin that the stabilizing material is inadequate to maintain the arc stable for the given diameter of welding electrode and rate of deposit of material, the arc tends to rise along the wall of the electrode seeking stabilizing material. If a substantial excess of the stabilizing material is present undesired oxides are produced in the weld and the weld may be of inferior quality.

By actually conducting welding operations I have found that numerous oxides and oxygen containing materials may be used. Among these are ferroso-ferric oxide ($Fe_3O_4$), manganese dioxide ($MnO_2$), titanium dioxide ($TiO_2$), calcium oxide (CaO), cerium dioxide and combinations of these oxides. In addition, I have found that coatings of tertiary phosphates, applied particularly to steel electrodes by bonderizing for example, and of lithium carbonate ($Li_2CO_3$) are suitable.

Suitable coating materials have several properties in common. It is essential that the coating material should be non-hygroscopic. The release of water vapor during the welding operation deteriorates the weld. The coating should also be as homogeneous as practicable. In addition, higher valent oxygen compounds appear preferable for coating.

It is an object of this invention to provide a method for making an arc stabilizing electrode of the type described above.

In accordance with this invention the core or wire on which the oxide or oxygen containing compound is to be deposited is first conditioned for deposit by roughening. The roughening may be effected mechanically by sandblasting or chemically by etching. The stabilizing compound is deposited on the roughened core or wire. If the deposit is effected mechanically, the coating is applied from a slip consisting of a powder of the material mixed in a vaporizable liquid and thereafter the coated wire is dried and the compound thoroughly kneaded onto the surface of the wire. The coating may also be applied chemically by oxidizing or phosphatizing the wire.

The novel features that I consider characteristic of my invention have been discussed generally above. The invention itself, however, both as to its organization and its method of operation together with additional objects and advantages thereof will best be understood from the following description of specific embodiments when read in connection with the accompanying drawing, in which:

Figure 1 is a diagrammatic view of apparatus for providing a coating in accordance with my invention on a welding electrode;

Fig. 2 is a diagrammatic view of one surface conditioner which may be used in the practice of my invention;

Fig. 3 is a view in cross section enlarged of an electrode in accordance with my invention;

Fig. 4 is a view in cross section enlarged of another electrode in accordance with my invention; and Fig. 5 is a graph showing a property of welding electrodes in accordance with my invention.

The apparatus shown in Fig. 1 is used to coat the welding electrode mechanically and includes a feed reel FR from which a wire W to be coated is derived and a take-up reel TR on which the coated electrode, in accordance with my invention, is wound.

For driving the wire W power may be applied to the take-up reel TR by a motor (not shown). The use of a feed reel FR in the apparatus shown in Fig. 1 presupposes that the wire W has been drawn before it is treated. In certain situations it may be highly practical to coat the wire just after it is drawn. In such situations the feed reel FR is replaced by the drawing apparatus and the wire W is fed directly from the drawing apparatus into the coating apparatus.

From the feed reel FR the wire W is supplied to a surface conditioner SC which produces on the surface of the wire W a roughening consisting of fine irregularities uniformly distributed over the surface of the wire. The irregularities should have a depth at least of the order of 33 to 62 microinches R.M.S. The roughening may be produced by ordinary sandblasting and wire so sandblasted has been found entirely suitable. The roughening may also be produced by drawing the wire W through a roughening die D as shown in Fig. 2. This die may be a hollow cylinder or disc, the internal surface of which has fine teeth or knurls. The interval diameter of the die is so related to the diameter of the wire W that as the wire is pulled through the die irregularities are cut in the surface of the wire. The die may be geared to a motor M and rotated to improve the uniformity of the irregularity.

The roughening may also be etched into the wire by drawing the wire through a suitable acid or caustic solution. I have found that the desired roughening may be produced by drawing the wire slowly through sulfuric of hydrochloric acid having a concentration of 25% by volume and maintained at 150° Fahrenheit. To produce irregularities of the desired depth the wire should be maintained in the acid bath for a time interval of the order of several minutes.

The wire W with its surface conditioned as described above is passed through a packing gland G into a slip S of the compound to be coated on the wire. The slip S is produced by mixing a powder of the material in water, alcohol, or other readily evaporating medium. The slip must be very thoroughly mixed so that it is homogeneous to the extent practicable; particularly is homogeneity necessary where several different compounds are applied to the wire W. The wire with the slip sticking to it is then passed through a felt pad F and is engaged by a plurality of felt rollers r1, r2, r3 and r4 which knead the coating into the spaces between the irregularities in the wire. Thereafter the wire W is passed through a drier H where it is heated so that the liquid remaining in the surface coating is thoroughly evaporated. The wire W passes through another plurality of felt rollers r5, r6, r7, or r8 which further knead the coating into the surface of the wire and in addition have a polishing effect removing coating from the projecting surfaces of the wire. The rollers r5, r6, r7, r8 may be glass cloth rather than felt.

An electrode E is thus produced; this electrode has a thin layer or coating (of the order of a few milligrams per foot for 1/16" wire) of the desired material on its surface and is so wound onto the take-up reel. Because the coating is thin the electrode may be readily wound on the take-up reel TR without disrupting the coating.

An enlarged section of one modification of the treated electrode E is shown in Fig. 3. From this view it is seen that the coating C is deposited in the region between projections P of the wire. The projections P extend between coated regions and provide surfaces at which electrical contact may be made with the electrode. The electrode produced usually has the form shown in Fig. 3 in which the surfaces P have no coating. It may also happen (particularly when the coating is chemically applied) that the coating may cover the projections P. This does not affect the ability of the wire to establish electrical contact, because the coating is very thin and when the electrode passes through the apparatus the coating on the projections P is rubbed off by the frictional contact with the apparatus.

An enlarged section of another modification of the treated electrode E1 is shown in Fig. 4. In this case the projections P1 are of uniform dimensions and are uniformly spaced and the coating C1 is deposited in the uniform spaces. A wire of this type would be produced with the roughening apparatus shown in Fig. 2.

When in use the electrode E (or E1) is transmitted through a welding head of the general type disclosed in Fig. 5 of my patent which does not, however, include deoxidizing powder (D Fig. 5). The projecting surfaces P (or P1) of the electrode then engage the adjacent conducting surfaces of the welding head and electrical contact is thus established between the electrode and the conducting portion of the welding head which is in turn connected to one terminal of the welding power supply. The other terminal of the supply is connected to the work and thus an arc is produced and supplied between the work and the electrode E (or E1).

The apparatus shown in Fig. 1 is suitable for applying the coating to the wire mechanically. The coating may also be applied chemically and in such event the wire is passed through the necessary chemical solutions, instead of the mechanical coating apparatus, after its surface has been conditioned.

For example, a steel electrode coated with ferrosoferric oxide which has proved highly satisfactory in the practice of my invention was produced chemically. This original wire is in this case of the type known in the trade as Mayari-R wire sold by Bethlehem Steel Company and an analysis of a wire actually used showed it to have the following composition:

| | Percent | | Percent |
|---|---|---|---|
| Carbon | .08 | Silicon | .22 |
| Sulphur | .025 | Chromium | .43 |
| Phosphorus | .056 | Nickel | .32 |
| Manganese | .53 | Copper | .39 | and the remainder iron.

To produce the electrode a wire of this type having a diameter of one-sixteenth of an inch was treated as follows:

(1) The wire was sandblasted with #60 Alundum grit projected under 60 pounds per square inch air pressure from nozzles displaced at 120° with reference to the wire. The wire traveled through the sandblasting chamber at between 48 and 150 inches per minute. This rate of travel is relatively low. If a higher rate of travel is desired the number of nozzles and the pressure may be increased in any manner desired.

(2) The wire roughened by sandblasting was passed through a mixture of chemicals composed of sodium hydroxide and potassium nitrate to which urea was added as a catalyzer. The solution was maintained at boiling temperature (between 290° and 300° Fahrenheit) and the wire was immersed in the solution from a time interval of from 5 to 30 minutes. A typical treating solution included the following chemicals per gallon of water: sodium hydroxide—80 ounces, potassium nitrate—50 ounces, urea—2 ounces.

A Mayari-R wire of the type described above may also be provided with a coating of tertiary phosphate chemically. The phosphate is usually insoluble (in water) and may be applied by several methods which are termed in the art phosphatizing. Usually the solution used in phosphatizing contains orthophosphoric acid as a common constituent. In addition the solution includes zinc phosphate, zinc dihydrogen phosphate, ferrous phosphate, ferrous dihydrogen phosphate, and manganese dihydrogen phosphate. These compounds are included either alone or in various combinations. The phosphate to free acid ratio is usually between 7 to 1 or 8 to 1. In each of the phosphatizing methods hydrogen is evolved at the metal surface and the phosphate precipitates. Accelerators of the reaction in the form of mild oxidizing agents such as the nitrates or nitrites of alkali metals, copper salts and nitro derivatives of aliphatic and aromatic compounds are ordinarily used.

In a typical situation I phosphatized a steel wire of the type described above with a bonderizing solution containing phosphate, orthophosphoric acid and a copper salt. The solution was maintained at a temperature of about 90° centigrade and the wire was immersed in the solution for about 10 minutes. The coating produced in this way had a thickness of between 0.0003 inch and 0.0005 inch.

In practicing my invention I made a number of welds with various coatings on the wire. Certain of the measurements conducted in making these welds are presented in the following table:

| No. of Row | Type of Coating | Quantity of Coating in Milligrams Per Foot | Welding Current in Amperes | Rate of Consumption of Electrode in Inches Per Minute | Roughening Treatment | How Coating Was Applied | Approx. Arc Voltage |
|---|---|---|---|---|---|---|---|
| 1 | $Fe_3O_4$ | 5 to 10 (Calculated) | 405 | 441 | Sandblasting | Chemically | 30 |
| 2 | $MnO_2$ | 3 (measured) | 405 | 406 | do | Mechanically | 28½ |
| 3 | $TiO_2$ | 2 (measured) | 425 | 396 | do | do | 28½ |
| 4 | $CaO$ | 4 (measured) | 440 | 324 | do | do | 28 |
| 5 | Phosphates | | 400 | | do | Chemically | 26 |
| 6 | $Li_2CO_3$ | | 360 | | do | Mechanically | |
| 7 | $MnO_2$ 5/1 $TiO_2$ | | 410 | 399 | do | do | 29 |
| 8 | $MnO_2$ 2/1 $TiO_2$ | 5 (measured) | 425 | 399 | do | do | 28 |
| 9 | $MnO_2$ 1/1 $TiO_2$ | 3.3 (measured) | 401 | 396 | do | do | 29 |
| 10 | $MnO_2$ 1/2 $TiO_2$ | 5.3 | 405 | 396 | do | do | 29 |
| 11 | $MnO_2$ 1/5 $TiO_2$ | 3.2 | 440 | 396 | do | do | 27 |
| 12 | $TiO_2$ 5/1 $MnO_2$ | | 425 | 333 | do | do | 28½ |
| 13 | $Fe_3O_4$ | 5 to 10 (calculated) | 385 | 414 | do | Chemically | 30½ |
| 14 | $Fe_3O_4$ | do | 340 | 360 | do | do | 29 |
| 15 | $Fe_3O_4$ | do | 295 | 300 | do | do | 30 |
| 16 | $Fe_3O_4$ | do | 365 | 363 | do | do | 30½ |
| 17 | $Fe_3O_4$ | do | 310 | 303 | do | do | 30 |
| 18 | $MnO_2$ 5/1 $TiO_2$ | | 355 | 315 | do | Mechanically | 28½ |
| 19 | $MnO_2$ 5/1 $TiO_2$ | | 305 | 278 | do | do | 28½ |
| 20 | $MnO_2$ 5/1 $TiO_2$ | | 410 | 359 | do | do | 29 |
| 21 | $MnO_2$ 5/1 $ZrO_2$ | | 398 | 371 | Etched—$H_2SO_4$ | do | 29½ |
| 22 | $MnO_2$ 5/1 $ZrO_2$ | | 335 | 312 | do | do | 27 |
| 23 | $MnO_2$ 5/1 $ZrO_2$ | | 300 | 301 | do | do | 26 |
| 24 | $MnO_2$ 5/1 $ZrO_2$ | | 455 | 432 | do | do | 29 |

All of the welds from which the above table was derived were made with Mayari-R wire 1/16 inch in diameter. In all cases low carbon mild steel was welded, and the operation was at straight polarity. In all cases a shield of pure argon was provided, the argon flowing at 45 cubic feet per hour. When the coating was applied mechanically the slip was made up of material of particles having dimensions which varied from 200 mesh to dust. In the cases in which the wire was roughened by etching, the etching was applied with sulfuric acid in a 25% by volume solution maintained at 150° F. and the wire was treated with the acid for at least 7 minutes.

The welds were made with a welder of the type shown in Fig. 5 of my parent patent. Specifically for many of the welds a Linde welder SWM-2 was used. In all cases sound welds were produced. The welds produced with the electrode covered with ferroso-ferric oxide were tested for ductility and proved exceptionally ductile.

All of the welds except those produced with phosphatized wire were made with a welding head which required that the arc voltage measurement be made with the measuring electrodes between the work and a point on the welding wire remote from the tip at which the arc was produced. A correction of 2½ volts for voltage drop along the wire was therefore made in these measurements and the data in the last column is in each case except for the phosphatized wire the measured data less 2½ volts. It may be that the correction of 2½ volts is too low and for this reason the voltage for the phosphatized wire is substantially lower than the other voltages.

While the arc was maintained stabilized in all cases, coatings including substantial quantities of manganese dioxide have the advantage that they produce a superior surface on the weld. In addition to producing operation with improved stability, manganese dioxide, titanium dioxide and calcium oxide, have the advantage over ferroso-ferric oxide in that the latter has a tendency to spray solid material towards the wall of the inert gas nozzle and thus to build up a blocking layer across the opening of the nozzle whereas the former do not.

Attention is called to the fourth column of the table which shows the rate of electrode consumption. This column shows that for the same approximate power consumed in the arc the consumption rate of wire coated with ferroso-ferric oxide is higher than the consumption rate for wire coated with manganese dioxide and the consumption rate for wire coated with calcium oxide is substantially lower than for wire coated with manganese dioxide. The rate of consumption in effect measures the heat developed at the welding electrode. The fourth column then indicates that for substantially the same power input to the arc less heat is developed at the electrode for a coating of calcium oxide than for manganese dioxide and less is developed for manganese dioxide than for ferroso-ferric iron oxide. Since the power in the arc is in each case the same, the deficiency of the heat developed at the electrode must be compensated by a corresponding increase in the heat developed at the work and an increased penetration of the welding material into the work. Thus different coatings produce different penetrations. One feature of my invention then is the facility for providing welding wires capable of producing desired penetrations.

This feature of my invention is shown in another way in Fig. 5 in which rate of consumption is plotted vertically and welding current horizontally for rows 13 through 17, 18 through 20 and 21 through 24 of the table. Fig. 5 shows that the graph for the ferroso-ferric oxide coating has the highest slope, the graph for the manganese dioxide, zirconium dioxide coating, an intermediate slope and the graph for the manganese dioxide, titanium dioxide coating a somewhat smaller slope. Only one measurement is available for calcium oxide and this measurement indicates that the slope of the corresponding curve of calcium oxide would be even smaller than for the manganese dioxide, titanium dioxide curve.

The slope of the curves is a measure of the rate of consumption of the electrode at a given power and thus of the energy absorbed at the work if the welding is at straight polarity. Since the energy absorbed at the work determines the penetration, desired penetration may be achieved by selecting in accordance with the curve the required electrodes.

I have also investigated electrodes coated with a mixture of manganese dioxide, titanium dioxide and calcium oxide and have found this mixture to have an even more marked effect on the heat developed at the work than calcium oxide alone. One feature of my invention is the provision of different electrodes having coatings consisting of different mixtures of manganese dioxide, titanium dioxide and calcium oxide which could be used in accordance with the penetration desired.

While as a rule stabilization is effected with the electrode according to my invention without producing an excess of oxygen. In certain situations an excess of oxygen may be produced and in such situation it is desirable that a deoxidizing agent should be included in the wire or in the coating.

While I have shown and described certain specific aspects of my invention, many modifications thereof are possible. Thus while my invention is disclosed herein specifically as embodied in ferrous electrodes, in its broader aspects, it is applicable to electrodes of other metals and alloys, such as aluminum and its alloys and copper and its alloys.

My invention thus is not to be restricted except insofar as necessitated by the spirit thereof in view of the prior art.

I claim as my invention:

1. The method of producing an arc-welding electrode which comprises roughening the surface of a wire by continuously passing said wire through a surface roughener, and depositing a layer of arc-stabilizing compound on the roughened surface of said wire by passing it through an oxidizing solution.

2. The method of producing an arc-welding electrode which comprises roughening the surface of a steel wire by continuously passing said wire through a surface roughener, chemically depositing a layer of arc-stabilizing compound on the roughened surface of said wire by passing it through a phosphatizing solution.

3. The method of producing an arc-welding electrode which comprises roughening the surface of a steel wire by continuously passing said wire through a surface roughener, chemically depositing a layer of arc-stabilizing compound on the roughened surface of said wire by passing it through a chemical solution selected from the group consisting of iron oxidizing and iron phosphatizing solutions.

4. The method of producing an arc-welding electrode which comprises roughening the surface of a wire by continuously passing said wire through a surface roughener, depositing a layer of arc-stabilizing compound on the roughened surface of said wire by passing it through a slip of said compound consisting of a powder of said compound mixed in a readily evaporating medium which is liquid at room temperature, and thereafter kneading said compound into said wire and drying said wire.

5. The method of producing an arc-welding electrode which comprises roughening the surface of a wire by continuously passing said wire through a surface roughener thus producing valleys and peaks in the surface of said wire, depositing a layer of arc-stabilizing compound on the roughened surface of said wire by passing it through a slip of said compound consisting of a powder of said compound mixed in a readily evaporating medium which is liquid at room temperature, kneading said compound into said wire, drying said wire after said compound has been kneaded in and again kneading said compound into said dried wire, and removing any portions of said compound deposited on said peaks.

6. The method of producing an arc-welding electrode which comprises roughening the surface of a wire by continuously subjecting said wire to sand blasting, the surface of said wire when roughened having peaks and valleys, depositing a layer of arc-stabilizing compound on the roughened surface of said wire by passing it through a slip of said compound consisting of a powder of said compound mixed in a readily evaporating medium which is liquid at room temperature, kneading said compound into said wire, drying said wire after said compound has been kneaded in and again kneading said compound into said dried wire, said last-named kneading action also removing any portions of said compound from said peaks.

7. The method of producing an arc-welding electrode which comprises roughening the surface of a wire by continuously passing said wire through an etching solution containing sulphuric acid at a temperature at least of the order of 150° F., the surface of said wire when roughened having peaks and valleys, depositing a layer of arc-stabilizing compound on the roughened surface of said wire by passing it through a slip of said compound consisting of a powder of said compound mixed in a readily evaporating medium which is liquid at room temperature, kneading said compound into said wire, drying said wire after said compound has been kneaded, and again kneading said compound into said dried wire and removing any portions of said compound from said peaks.

8. The method of producing an arc-welding electrode which comprises roughening the surface of a wire by continuously passing said wire through an etching solution containing hydrochloric acid at a temperature at least of the order of 150° F., the surface of said wire when roughened having peaks and valleys, depositing a layer of arc-stabilizing compound on the roughened surface of said wire by passing it through a slip of said compound consisting of a powder of said compound mixed in a readily evaporating medium which is liquid at room temperature, kneading said compound into said wire, drying said wire after said compound has been kneaded in and again kneading said compound into said dried wire and removing any portions of said compound from said peaks.

9. The method of producing an arc-welding electrode which comprises roughening the surface of a wire by continuously passing said wire through an etching solution containing ammonium persulfate at a temperature at least of the order of 150° F., the surface of said wire when roughened including peaks and valleys, depositing a layer of arc-stabilizing compound on the roughened surface of said wire by passing it through a slip of said compound consisting of a powder of said compound mixed in a readily evaporating medium which is liquid at room temperature, kneading said compound into said wire, drying said wire after said compound has been kneaded in and again kneading said compound into said dried wire and removing any portions of said compound from said peaks.

10. The method of producing an arc-welding electrode which comprises roughening the surface of a wire by continuously passing said wire through a surface roughener, the surface of said wire when roughened having peaks and valleys, depositing a layer of arc-stabilizing compound on the roughened surface of said wire by passing said wire through a slip of said compound consisting of a powder of said compound mixed in a readily evaporating medium which is liquid at room temperature, and thereafter kneading said compound into said wire, drying said wire, and removing any portions of said compounds from said peaks.

11. The method of producing an arc-welding electrode which comprises roughening the surface of a wire by continuously passing said wire through an etching solution at a temperature at least of the order of 150° F., said solution being selected from the class consisting of sulfuric acid, hydrochloric acid, ammonium persulfate, said surface of said wire when roughened having peaks and valleys, depositing a layer of arc-stabilizing compound on the roughened surface of said wire by passing said wire through a slip of said compound consisting of a powder of said compound mixed in a readily evaporating medium which is liquid at room temperature, kneading said compound into said wire, drying said wire, and removing any portions of said compounds from said peaks.

References Cited in the file of this patent

UNITED STATES PATENTS

| | | |
|---|---|---|
| 1,884,713 | Jerabek | Oct. 25, 1932 |
| 1,936,349 | Castle | Nov. 21, 1933 |
| 2,005,902 | Mathias | June 25, 1935 |
| 2,016,139 | Eddison | Oct. 1, 1935 |
| 2,021,628 | Larson | Nov. 19, 1935 |
| 2,102,813 | Southgate | Dec. 21, 1937 |
| 2,148,331 | Weisberg | Feb. 21, 1939 |
| 2,203,064 | Schueler | June 4, 1940 |
| 2,318,642 | Thompson | May 11, 1943 |